(12) United States Patent
Takabatake et al.

(10) Patent No.: US 11,404,712 B2
(45) Date of Patent: Aug. 2, 2022

(54) FUEL-CELL END PLATE

(71) Applicant: TOYOTA JIDOSHA KABUSHIKI KAISHA, Toyota (JP)

(72) Inventors: Yuma Takabatake, Okazaki (JP); Masahiro Katayama, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/125,292

(22) Filed: Dec. 17, 2020

(65) Prior Publication Data

US 2021/0305616 A1 Sep. 30, 2021

(30) Foreign Application Priority Data

Mar. 24, 2020 (JP) .............................. JP2020-052524

(51) Int. Cl.
*H01M 8/2465* (2016.01)
(52) U.S. Cl.
CPC ................................ *H01M 8/2465* (2013.01)

(58) Field of Classification Search
CPC .................................................. H01M 8/2465
See application file for complete search history.

(56) References Cited

U.S. PATENT DOCUMENTS

| 2015/0037707 | A1* | 2/2015 | Nishiyama | ............ | H01M 8/241 |
| | | | | | 429/470 |
| 2021/0167411 | A1* | 6/2021 | Hanafusa | ............ | H01M 8/0206 |

FOREIGN PATENT DOCUMENTS

JP 2015-032421 A 2/2015

* cited by examiner

*Primary Examiner* — Brian R Ohara
(74) *Attorney, Agent, or Firm* — Finnegan, Henderson, Farabow, Garrett & Dunner, LLP

(57) ABSTRACT

Provided is a fuel-cell end plate that is disposed at an end, in a stacking direction, of a fuel cell stack formed by stacking members including a single cell. This fuel-cell end plate has, on a surface disposed so as to face the outside of the fuel cell stack, a first rib that extends in a first direction and a second rib that extends in a second direction different from the first direction, intersects the first rib, and is formed so as to be shorter in height than the first rib.

6 Claims, 5 Drawing Sheets

|  | γ (mm) | STRESS IN REGION A (MPa) | STRESS IN REGION B (MPa) |
|---|---|---|---|
| SAMPLE 1 | 0 | x | x-35 |
| SAMPLE 2 | 4 | x-51 | x-35 |
| SAMPLE 3 | 8 | x-55 | x-32 |
| SAMPLE 4 | 12 | x-55 | x-28 |
| SAMPLE 5 | 16 | x-70 | x-24 |

FUEL-CELL END PLATE

CROSS-REFERENCE TO RELATED APPLICATION

This application claims priority to Japanese Patent Application No. 2020-052524 filed on Mar. 24, 2020, incorporated herein by reference in its entirety.

BACKGROUND

1. Technical Field

This disclosure relates to a fuel-cell end plate.

2. Description of Related Art

There is a known configuration of a fuel-cell end plate in which, to enhance the strength thereof, pluralities of reinforcing ribs extending in a horizontal direction and a vertical direction (longitudinal and lateral directions) are provided in a lattice pattern on an outer surface of the fuel-cell end plate. (See, e.g., Japanese Patent Application Publication No. 2015-032421.)

SUMMARY

The inventors of the present application have found that when ribs extending in the longitudinal and lateral directions are provided in a lattice pattern as described above, an undesirably large stress can be locally generated near a portion at which a rib extending in the longitudinal direction and a rib extending in the lateral direction intersect each other. If such a large stress is locally generated, the end plate may become fatigued and decrease in strength.

This disclosure can be implemented in the following forms.

(1) As one form of this disclosure, a fuel-cell end plate is provided that is disposed at an end, in a stacking direction, of a fuel cell stack formed by stacking a plurality of members including a single cell. This fuel-cell end plate includes, on a surface that is disposed so as to face the outside of the fuel cell stack, a first rib that extends in a first direction and a second rib that extends in a second direction different from the first direction, intersects the first rib, and is formed so as to be shorter in height than the first rib. In the fuel-cell end plate of this form, the height of the second rib is set to be shorter than the height of the first rib, which can reduce the magnitude of a stress that is locally generated in the end plate.

(2) In the fuel-cell end plate of the above form, the difference in height between the first rib and the second rib may be not smaller than 4 mm. The fuel-cell end plate of this form can enhance the reducing effect on the magnitude of a stress that is locally generated in the end plate.

(3) In the fuel-cell end plate of the above form, the first rib may be a rib in which a maximum value of a stress generated is larger than a maximum value of a stress generated in the second rib when it is assumed that the second rib is formed so as to be equal in height to the first rib and that the fuel-cell end plate having these ribs is incorporated into the fuel cell stack. In the fuel-cell end plate of this form, it is possible to enhance the mitigating effect on the local increase in stress in the end plate as a whole by reducing the stress generated in the first rib in which a larger stress is generated if the first rib and the second rib are equal in height to each other.

(4) In the fuel-cell end plate of the above form, the fuel-cell end plate may be a plate-shaped member having, as seen from the stacking direction, a quadrangular shape bounded by a pair of short sides that are disposed opposite each other and a pair of long sides that are disposed opposite each other and formed so as to be longer than the pair of short sides. The first rib may be formed so as to connect the pair of long sides to each other, and the second rib may be formed so as to connect the pair of short sides to each other. The fuel-cell end plate of this form can reduce the magnitude of a stress that is locally generated in the first rib in which a larger stress is likely to be generated.

(5) In the fuel-cell end plate of the above form, the first rib and the second rib may be provided in a region that overlaps the single cell when the fuel cell stack is seen from the stacking direction. In the fuel-cell end plate of this form, the first rib and the second rib are provided in the region of the fuel-cell end plate which overlaps the single cell and in which therefore the amount of deformation tends to be large. This makes it possible to enhance the mitigating effect on the local increase in stress while securing the strength of the fuel-cell end plate against deformation.

(6) In the fuel-cell end plate of the above form, a plurality of fastening points for fastening the fuel cell stack may be provided, and at least either of the first rib and the second rib may include a rib that is provided at such a position as to connect two of the fastening points to each other. In the fuel-cell end plate of this form, providing the first rib or the second rib can further enhance the improving effect on the rigidity of the end plate.

This disclosure can be implemented in various other forms than those described above; for example, the disclosure can be implemented in the form of a manufacturing method of a fuel-cell end plate, a fuel cell including an end plate, etc.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. Overall Configuration of Fuel Cell

Figure 1:
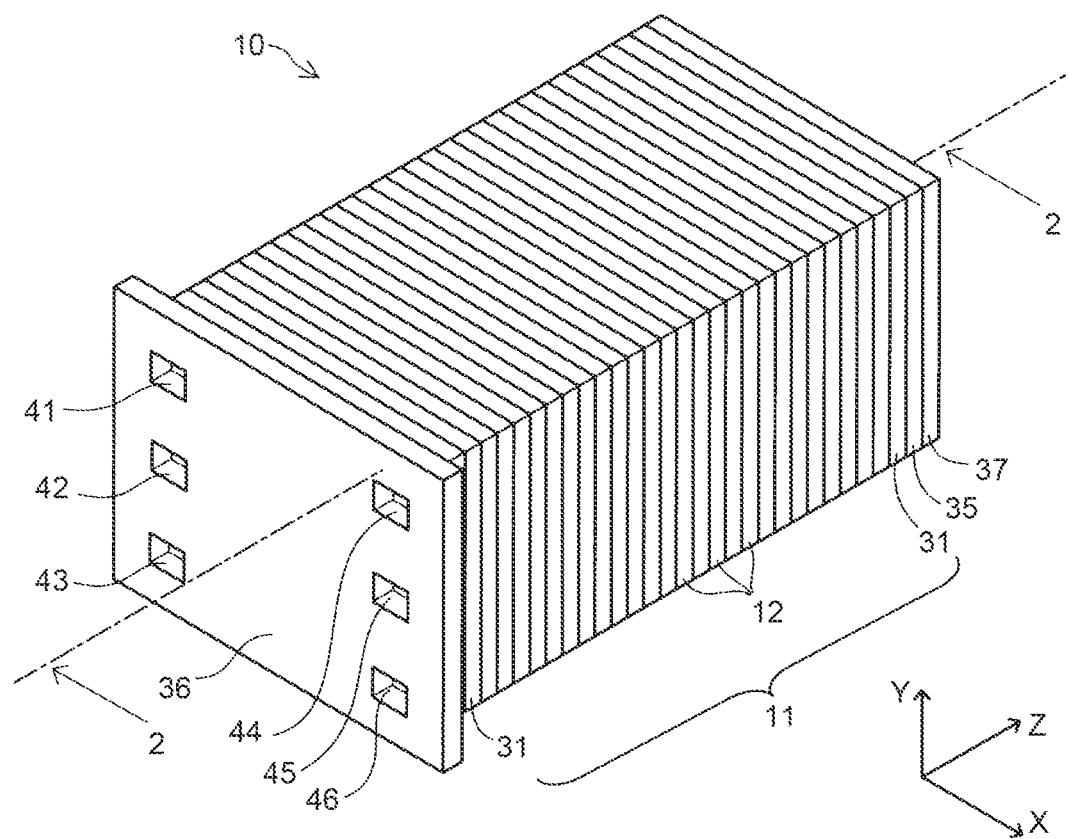
FIG. 1 is a perspective view showing an external appearance of a fuel cell stack.
Figure 2:
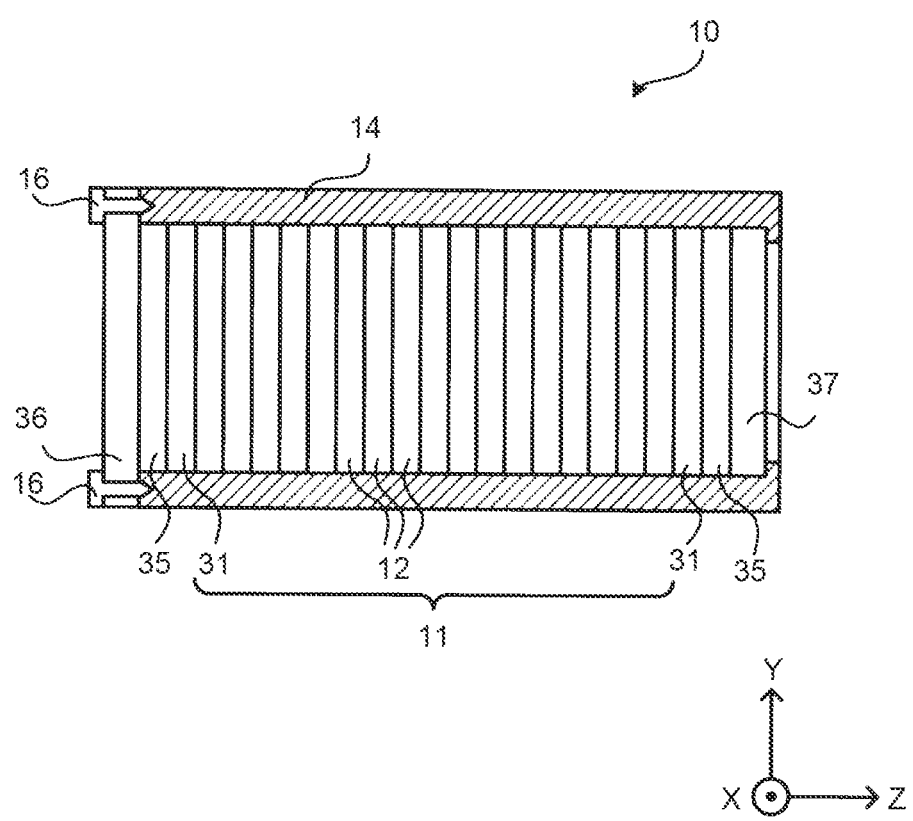
FIG. 2 is a schematic sectional view showing a general configuration of the fuel cell stack.

FIG. 1 is a perspective view showing an external appearance of a fuel cell stack 10 as one embodiment of this disclosure, and FIG. 2 is a schematic sectional view showing a general configuration of the fuel cell stack 10. In FIG. 1, the position of the section of FIG. 2 is indicated as section 2-2. In FIG. 1 and FIG. 2, and FIG. 3 and FIG. 4 to be described later, X, Y, and Z-axes that are orthogonal to one another are indicated to show the correspondence relationship among the drawings. The fuel cell stack 10 can be installed in a moving body, such as a vehicle, and used as a driving power source of the moving body. Alternatively, the fuel cell stack 10 may be used as a stationary power source.

The fuel cell stack 10 includes: a stack 11 formed by stacking a plurality of single cells 12; a pair of terminal plates 31; a pair of insulating plates (insulators) 35; and a pair of end plates 36, 37. In the fuel cell stack 10, the end plate 36, the insulating plate 35, the terminal plate 31, the stack 11, the terminal plate 31, the insulating plate 35, and the end plate 37 are stacked in this order. Thus, the end plates 36, 37 are disposed at ends, in a stacking direction, of the fuel cell stack 10. Although surfaces of the end plate 36 are represented as flat surfaces in FIG. 1 and FIG. 2, the surface of the end plate 36 (the surface on a −Z-side that faces an outside of the fuel cell stack 10) has recesses and protrusions including ribs. The specific shape of the end plate 36 will be described in detail later.

As shown in FIG. 2, the fuel cell stack 10 further includes a stack case 14. The stack case 14 is not shown in FIG. 1. The fuel cell stack 10 is produced by housing the stack stricture shown in FIG. 1 into the stack case 14 from the side of the end plate 37. The stack case 14 has the stack structure of FIG. 1 supported on an inner wall at an end on a +Z-side. To produce the fuel cell stack 10, the stack structure is housed into the stack case 14 and the end plate 36 is fastened to the stack case 14 with bolts 16 that are fastening members, with a pressing force applied in the stacking direction of the single cells 12 (Z-direction). The stack case 14 may be omitted from the fuel cell stack 10, and the end plate 36 may be fastened by a different method, with a pressing force applied thereto in the stacking direction.

The fuel cell stack 10 generates electricity by being supplied with a fuel gas containing hydrogen and an oxidation gas containing oxygen. In each single cell 12 of the fuel cell stack 10, a flow passage through which the fuel gas flows is formed on an anode side and a flow passage through which the oxidation gas flows is formed on a cathode side, with an electrolyte membrane interposed therebetween. The flow passage through which the fuel gas flows inside each single cell 12 will be referred to also as an "in-cell fuel gas flow passage." The flow passage through which the oxidation gas flows inside each single cell 12 will be referred to also as an "in-cell oxidation gas flow passage." Further, an "inter-cell refrigerant flow passage" through which a refrigerant for cooling the fuel cell stack 10 flows is formed between adjacent single cells 12. The fuel cell stack 10 in this embodiment is a polymer electrolyte fuel cell, but the fuel cell stack 10 is not limited to a polymer electrolyte fuel cell and may instead be other type of fuel cell, such as a solid oxide fuel cell.

Electricity generated by electrochemical reactions in the fuel cell stack 10 is collected at the terminal plates 31 and taken out from the terminal plates 31. The insulating plates 35 are made of an insulating material, such as rubber or resin. The end plates 36, 37 can be composed of a metal material, for example, aluminum or aluminum alloy, or stainless steel.

As shown in FIG. 1 the end plate 36 has six holes 41 to 46 at an outer peripheral part. The "outer peripheral part" of the end plate 36 means a part of the end plate 36 that is located near the perimeter of the end plate 36 as seen from the stacking direction. The insulating plates 35, the terminal plates 31, and the stack 11 also have similar holes at positions that overlap the holes 41 to 46 in the stacking direction. These holes form manifolds that extend through the fuel cell stack 10 in the stacking direction. Specifically, these holes form reactant gas manifolds through which the fuel gas and the oxidation gas are supplied or discharged among the in-cell fuel gas flow passages and among the in-cell oxidation gas flow passages, and refrigerant manifolds through which the refrigerant is supplied or discharged among the inter-cell refrigerant flow passages. The holes 41 to 46 provided in the end plate 36 are openings of those manifolds, and pipes for supplying or discharging the fuel gas, the oxidation gas, or the refrigerant to or from the fuel cell stack 10 are connected to the holes 41 to 46.

While in this embodiment all the manifolds open at one end side of the fuel cell stack 10 (the side of the end plate 36) as shown in FIG. 1, a different configuration may be adopted. For example, at least some of the six manifolds may open on the side of the end plate 37. Further, a different member may be additionally disposed inside the fuel cell stack 10; for example, a member that absorbs fluctuations in fastening pressure (e.g., a leaf spring) may be provided on one end side (e.g., the side of the end plate 37 that does not have manifold openings).

B. Configuration of End Plate

Figure 3:
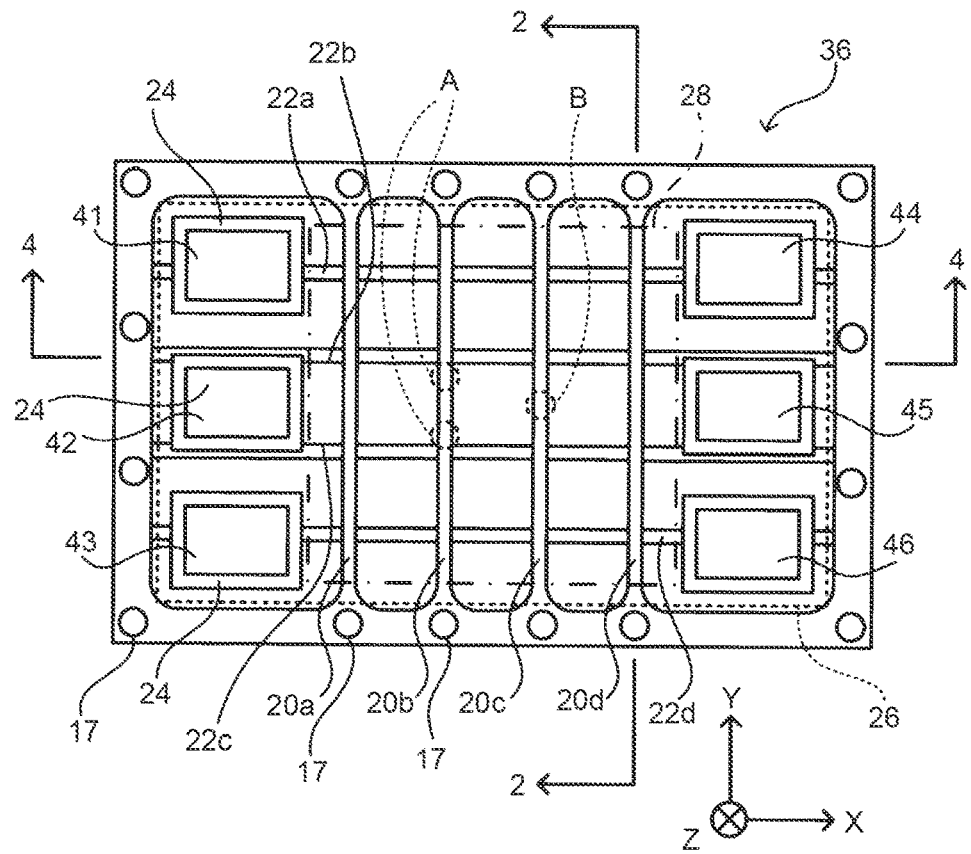
FIG. 3 is a plan view showing the surface shape of an end plate.
Figure 4:
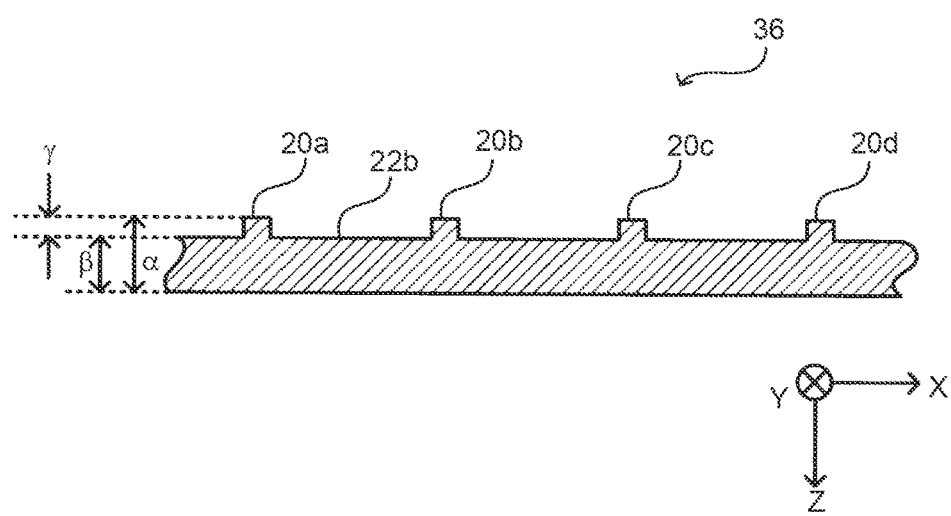
FIG. 4 is a schematic sectional view of the end plate.

FIG. 3 is a plan view schematically showing the shape of one surface of the end plate 36, particularly, the shape of the surface on the −Z-side. FIG. 4 is a schematic sectional view of the end plate 36. In FIG. 3, the position of the section of FIG. 4 is indicated as section 4-4, and the position corresponding to the section of FIG. 2 already described is indicated as section 2-2.

Since the end plate 36 is fastened at the outer peripheral part to the stack case 14 as shown in FIG. 2, the end plate 36 is sized with an allowance for the fastening relative to the size of the stacking surface of the single cell 12. The size of the end plate 36 can be set as appropriate according to the size of the single cell 12, the thickness of the stack case 14, etc. For example, from the viewpoint of securing a large area of the stacking surface of the single cell 12 and enhancing the power generation performance of the fuel cell, the length of the end plate 36 in the X-direction is preferably not smaller than 100 mm, more preferably not smaller than 200 mm, and even more preferably not smaller than 300 mm. From the viewpoint of making the fuel cell compact, the length of the end plate 36 in the X-direction is preferably not larger than 600 mm, more preferably not larger than 500 mm, and even more preferably not larger than 400 mm. From the viewpoint of securing the power generation performance of the fuel cell as described above, the length of the end plate 36 in the Y-direction is preferably not smaller than 100 mm, more preferably not smaller than 150 mm, and even more preferably not smaller than 200 mm. From the viewpoint of making the fuel cell compact, the length of the end plate 36 in the Y-direction is preferably not larger than 500 mm, more preferably not larger than 400 mm, and even more preferably not larger than 300 mm. However, the size of the end plate 36 may be smaller or larger than those ranges.

The thickness of the end plate 36 can be arbitrarily set as long as the end plate 36 can have adequate rigidity as a member to be fastened to the fuel cell stack 10 with a pressing force applied thereto. For example, from the viewpoint of securing sufficient rigidity, the thickness of the end plate 36 is preferably not smaller than 10 mm, more preferably not smaller than 15 mm, and even more preferably not smaller than 20 mm. From the viewpoint of making the fuel cell compact and lightweight, the thickness of the end plate 36 is preferably not larger than 70 mm, more preferably not larger than 60 mm, and even more preferably not larger than 50 mm. However, the thickness of the end plate 36 may be smaller or larger than those ranges. The "thickness of the end plate 36" refers to the distance from a contact surface of the end plate 36 that is parallel to an XY-plane and comes into contact with the insulating plate 35 to a highest position in the end plate 36 (a point in the surface of the end plate 36 on the −Z-side that is farthest away from the contact surface in a −Z-direction).

As shown in FIG. 3, the end plate 36 is provided with a plurality of (in FIG. 3, 16) bolt holes 17 at the peripheral part. The bolt holes 17 are portions where the bolts 16 that are fastening members are inserted and fastened to the stack case 14 to house the stack structure shown in FIG. 1 into the stack case 14 as shown in FIG. 2. The portions where the bolt holes 17 are provided will be referred to also as "fastening points." The fastening points are provided closer to the perimeter than the holes 41 to 46 are. In the fuel cell stack 10, as the end plate 36 is fastened at the fastening points of the outer peripheral part to the stack case 14 as described above, a force in the opposite direction from a fastening pressure is generated as a reaction force in a region of the end plate 36 that is located closer to the center of the stacking surface than the fastening points are, for example, a region where the end plate 36 overlaps the single cell 12 in the stacking direction (Z-direction). In other words, a force in the −Z direction is applied to the end plate 36 from the side of the stack 11. In FIG. 3, the region where the end plate 36 overlaps the stack 11 as seen from the stacking direction is indicated as a single-cell region 26. The force thus applied from the side of the stack 11 causes deformation of the end plate 36. Specifically, when the fastening points are provided as shown in FIG. 3 along each of sides forming the perimeter of the end plate 36 that has a quadrangular shape as seen from the stacking direction, the end plate 36 warps outward (in the −Z direction), with the extent of warping increasing from the perimeter toward the center. As a result, a stress is generated in the end plate 36. The fixing method of the end plate 36 may be a method other than fixing to the stack case 14 with the bolts 16. The number and positions of the fastening points are not limited to those shown in FIG. 3 but can be changed in various ways.

The end plate 36 is further provided with first ribs 20a to 20d and second ribs 22a to 22d as a plurality of protrusions that extends in a linear shape. The first ribs 20a to 20d are formed parallel to a Y-direction. The extension direction of the first ribs 20a to 20d (Y-direction) will be referred to also as a "first direction." The second ribs 22a to 22d are formed parallel to the X-direction and intersect the first ribs 20a to 20d. The extension direction of the second ribs 22a to 22d (X-direction) will be referred to also as a "second direction." In this embodiment, the first ribs 20a to 20d are formed so as to be equal in height to one another, and the second ribs 22a to 22d are also formed so as to be equal in height to one another. Like the thickness of the end plate 36, the height of the first ribs 20a to 20d and the height of the second ribs 22a to 22d refer to the distance from the above-described contact surface that is a back surface of the end plate 36 to a highest position in the rib (a point in the surface of the end plate 36 on the −Z-side that is farthest away from the contact surface in the −Z-direction). Thus providing the first ribs 20a to 20d extending in the Y-direction and the second ribs 22a to 22d extending in the X-direction can enhance the bending rigidity of the end plate 36 against the aforementioned warping it undergoes.

In the end plate 36 of this embodiment, the height of the second ribs 22a to 22d is set to be shorter than the height of the first ribs 20a to 20d. In FIG. 4, the height of the first ribs 20a to 20d in the end plate 36 is indicated as a "height α," and the height of the second ribs 22a to 22d is indicated as a "height β." In this embodiment, the following relationship holds: the height α>the height β. When the second ribs 22a to 22d are thus formed so as to be shorter in height than the first ribs 20a to 20d, a step is formed at each intersection between the first ribs 20a to 20d and the second ribs 22a to 22d. In FIG. 4, the difference between the height of the first ribs 20a to 20d and the height of the second ribs 22a to 22d is indicated as a "difference γ." The difference γ in this embodiment is the length in the Z-direction of the step at the intersection. From the viewpoint of reducing a local stress to be described later, the difference γ is preferably not smaller than 3 mm, and more preferably not smaller than 4 mm. From the viewpoint of the ease of processing and handling, the difference γ is preferably not larger than 25 mm, and more preferably not larger than 20 mm. However, the difference γ may be smaller than 3 mm or larger than 25 mm. The difference γ will be described in detail later. The width of the first ribs 20a to 20d and the width of the second ribs 22a to 22d can be set to, for example, an equal width. Here, that the widths of the ribs are equal is a broad concept that includes a case where the difference in width between the ribs is, for example, 10% or smaller. However, the width of the first ribs 20a to 20d and the width of the second ribs 22a to 22d may be different from each other, and the width may vary among the first ribs 20a to 20d or among the second ribs 22a to 22d.

As shown in FIG. 3, the surface of the end plate 36 on the −Z-side further has protrusions 24 that are provided so as to surround the respective holes 41 to 46. Providing the protrusions 24 can enhance the rigidity of the end plate 36 near the holes 41 to 46 and also makes it easy to connect the pipes for the fuel gas, the oxidation gas, and the refrigerant to the holes 41 to 46. In this embodiment, the protrusions 24 are formed so as to be equivalent in height to the first ribs 20a to 20d. In this embodiment, the outer peripheral part of the end plate 36 including the fastening points is formed so as to be as thick as the first ribs 20a to 20d.

In the end plate 36 of this embodiment configured as has been described above, the height of the second ribs 22a to 22d is set to be shorter than the height of the first ribs 20a to 20d, which can reduce the magnitude of a stress that is locally generated in the end plate 36. If a large stress is repeatedly or continuously generated at a specific portion of the end plate 36, the end plate 36 may become fatigued and decrease in strength. When ribs with different heights are provided as in this embodiment so as to reduce the magnitude of the stress that is locally generated, a decrease in strength of the end plate 36 due to fatigue can be mitigated. In the following, a relationship between local stresses generated in the end plate 36 and the heights of the ribs will be further described.

Stresses generated in the end plate 36 can be calculated by a computer-aided engineering (CAE) analysis using conditions such as the shape of the end plate 36, the material of the end plate 36, the fixing method of the end plate 36 (including the fixing position and whether the end plate 36 can rotate around a fixed portion), the shape and material of a member adjacent to the end plate 36 (in this embodiment, the insulating plate 35), the distribution of a load input from the side of the stack 11, and conditions of restraining at an interface between the end plate 36 and the adjacent member (including whether the two can slide over each other).

Figure 5:
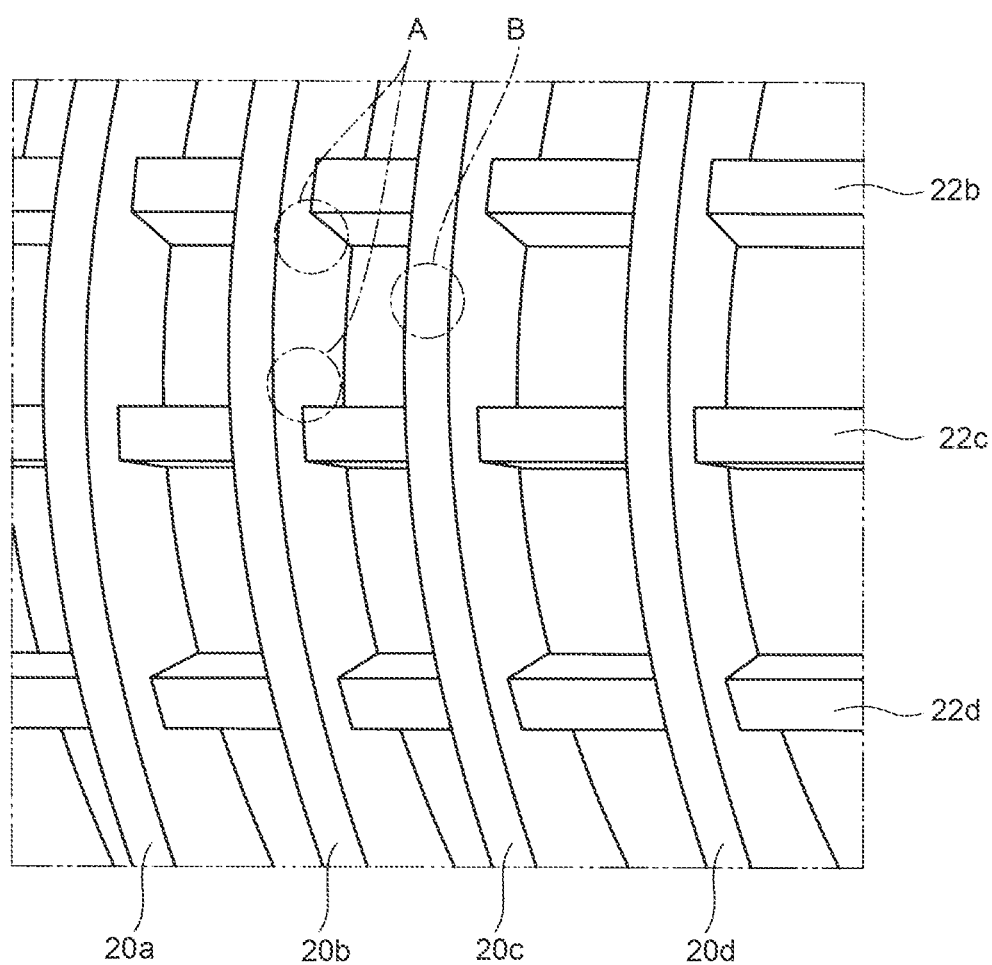
FIG. 5 is a perspective view showing the surface shape of the end plate of an embodiment.
Figures 6, 7:
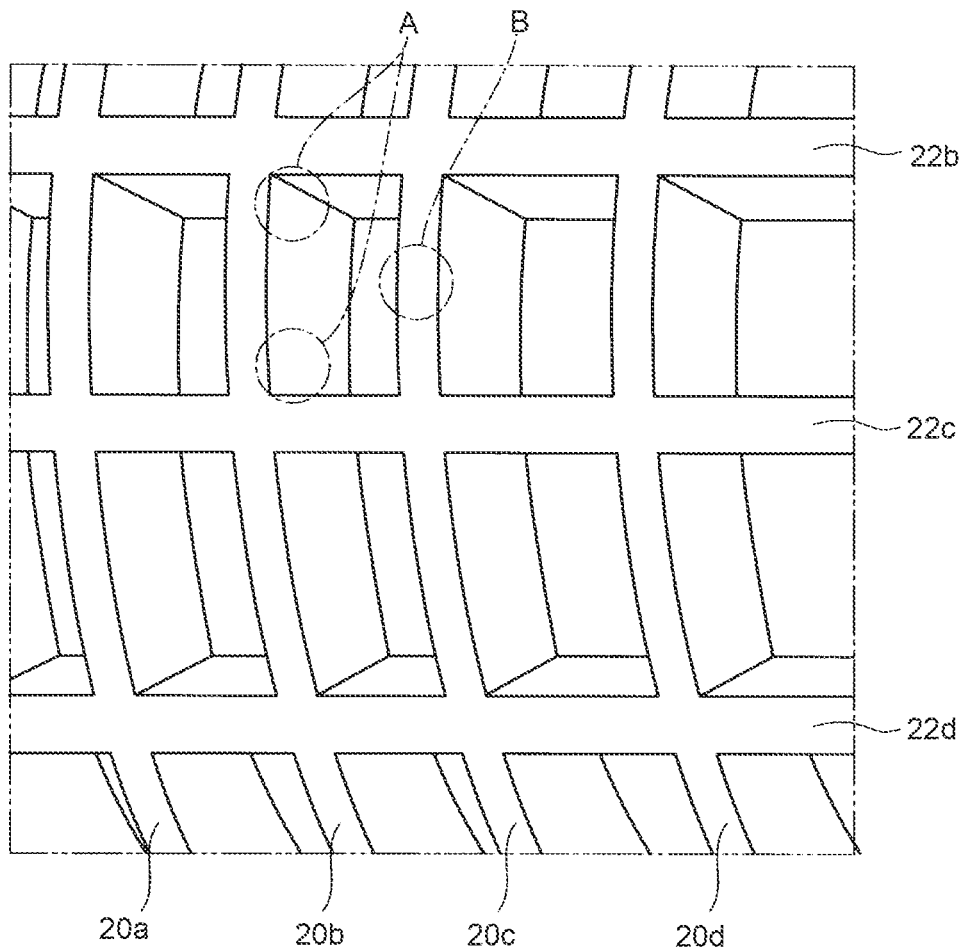
FIG. 6 is a perspective view showing the surface shape of an end plate of a comparative example.
FIG. 7 is a table showing a comparison of the magnitudes of stresses generated in regions A and regions B.

FIG. 5 is a close-up perspective view schematically showing the surface shape of the end plate 36 of this embodiment. FIG. 6 is a close-up perspective view schematically showing the surface shape of an end plate of a comparative example. In the end plate 36 of FIG. 5, the second ribs 22a to 22d are formed so as to be shorter in height than the first ribs 20a to 20d, while in the end plate of the comparative example of FIG. 6, the first ribs 20a to 20d and the second ribs 22a to 22d are formed so as to be equal in height to each other. In FIG. 5 and FIG. 6, how the end plates warp under a force applied in the −Z-direction from the side of the stack 11 is represented in an exaggerated manner.

A CAE analysis conducted on the end plates shown in FIG. 5 and FIG. 6 found that, in each end plate, a large stress was locally generated near each intersection between the first ribs 20a to 20d and the second ribs 22a to 22d and at a central portion of each rib between the intersections. In FIG. 5 and FIG. 6, and FIG. 3 already described, a region near the intersection is indicated as a "region A" and a region at the central portion between the intersections is indicated as a "region B."

Each rib curves when the end plates warp under a force applied in the −Z-direction from the side of the stack 11. In this case, each of the first ribs 20a to 20d and the second ribs 22a to 22d is restrained at the intersections by other ribs, so that each short section between the intersections (hereinafter, the short section in each rib between the intersections will be referred to also as a "rib segment") bends with a large curvature. This seems to explain why especially large stresses are generated near the intersections, i.e., at ends of the rib segments between the intersections. As a result of the CAE analysis, the region A where a large stress is locally generated was identified to be a portion of a side surface of each rib in a region near an intersection (see FIG. 5 and FIG. 6) (data not shown).

As described above, the region B is a top portion of each rib segment that is bent while being restrained at both ends by the intersections. As a result of the CAE analysis, the region B where a large stress is locally generated was identified to be a central portion of a surface on the −Z-side of each rib segment between the intersections (see FIG. 5 and FIG. 6) (data not shown).

FIG. 7 is a table showing the magnitudes of stresses (von Mises stresses) generated in the regions A and the regions B that were obtained as a result of a CAE analysis conducted with the difference in height γ between the first ribs 20a to 20d and the second ribs 22a to 22d varied. In FIG. 7, the end plate of the comparative example shown in FIG. 6, i.e., the end plate with the difference γ=0 is shown as Sample 1. Samples 2 to 5 are the end plates 36 of this embodiment, in which the relationship "the height α of the first ribs>the height β of the second ribs" holds and among which the difference γ varies. The dimensions of the difference γ in Samples 2, 3, 4, and 5 are 4 mm, 8 mm, 12 mm, and 16 mm, respectively. In FIG. 7, the value of the stress in the region A (a maximum stress in a rib segment of a first rib near an intersection) of Sample 1 that is a comparative example is represented by "x." The value of the stress in the region B of Sample 1 (a maximum stress at a central portion of the rib segment of the first rib) and the values of the stresses in the regions A and the regions B of the other samples are shown as relative values as compared with "x."

It turned out that in Sample 1 of the comparative example, an especially large stress was generated in the region A as shown in FIG. 7. By comparison, in Samples 2 to 5 in which the second ribs 22a to 22d were shorter in height than the first ribs 20a to 20d, the stresses in the regions A were found to be significantly lower. This may be explained as follows: As the second ribs were reduced in height, the force with which the first ribs 20a to 20d were restrained at the intersections by the second ribs 22a to 22d was reduced. This helped achieve a state in which each of the first ribs 20a to 20d bends as a whole with a smaller curvature, instead of the separate rib segments of the first ribs 20a to 20d bending independently with a large curvature, which resulted in a lower stress in the region A.

It was found that the reducing effect on the stress in the region A tends to increase as the difference γ increases, and that the stress in the region B tends to increase as the difference γ increases. Also in the case where increasing the difference γ caused an increase in the stress generated in the region B compared with that in the comparative example, the value of the stress at a portion where a maximum stress is generated was reduced in the end plate 36 as a whole.

Thus, it was demonstrated that this embodiment can reduce the stress in the region A where an especially large stress is locally generated, while achieving an enhancing effect on the rigidity of the entire end plate 36 by having the two types of ribs (the first ribs 20a to 20d and the second ribs 22a to 22d) with different extension directions. Generally, the bending rigidity of an end plate seems to increase as the height of ribs increases. It follows then that, when providing two types of ribs extending in two different directions, increasing the height of each type of ribs as much as possible, for example, setting the heights of both types of ribs to the largest possible height, can enhance the rigidity of the entire end plate and improve the strength thereof. In this embodiment, however, one type of ribs (the second ribs 22a to 22d) of the two types of ribs (the first ribs 20a to 20d and the second ribs 22a to 22d) extending in two different directions is reduced in height to thereby mitigate the local increase in stress and, consequently, the decrease in strength of the end plate due to fatigue.

The end plate 36 of this embodiment is formed as a plate-shaped member having a quadrangular shape as seen from the stacking direction. In this case, the curvature of deformation accompanying warping of the end plate 36 is larger, and a larger stress is likely to be generated, in the short ribs (in this embodiment, the first ribs 20a to 20d) extending along the short sides (in this embodiment, the sides extending in the Y-direction) than in the long ribs (in this embodiment, the second ribs 22a to 22d) extending along the long sides (in this embodiment, the sides extending in the X-direction). Therefore, it is possible to enhance the mitigating effect on the local increase in stress in the end plate 36 as a whole by reducing the height of the second ribs 22a to 22d extending along the long sides so as to reduce the stresses generated in the regions A of the short first ribs 20a to 20d in which large stresses are likely to be generated. The first ribs 20a to 20d need not be parallel to the short sides, but it is desirable that these ribs be formed so as to connect the pair of opposite long sides to each other. The second ribs 22a to 22d need not be parallel to the long sides, but it is desirable that these ribs be formed so as to connect the pair of opposite short sides to each other.

In this embodiment, the first ribs 20a to 20d are each provided at such a position as to connect two bolt holes 17 provided on the opposite sides to each other. Similarly, at least some of the second ribs 22a to 22d may be each provided at such a position as to connect two bolt holes 17 provided on the opposite sides to each other. When at least some of at least either one of the first ribs 20a to 20d and the second ribs 22a to 22d are thus each provided at such a position as to connect two fastening points to each other, the improving effect that providing the ribs has on the rigidity of the end plate 36 can be further enhanced. However, a configuration may also be adopted in which none of the first ribs 20a to 20d and the second ribs 22a to 22d is provided at such a position as to connect two fastening points to each other.

The first ribs 20a to 20d and the second ribs 22a to 22d of this embodiment are provided in the region that overlaps the single cells 12 (the single-cell region 26) as seen from the stacking direction (see FIG. 3). When fastened to the stack case 14, the end plate 36 deforms under a force applied in the −Z-direction from the side of the stack 11. This configuration can enhance the mitigating effect on the local increase in stress while securing the strength of the end plate 36 against deformation. The first ribs 20a to 20d and the second ribs 22a to 22d of this embodiment are provided in a region that overlaps an electrolyte layer and an electrode layer of each single cell 12 (hereinafter referred to also as a power generation region 28) as seen from the stacking direction (see FIG. 3). The region overlapping the power generation region 28 is a region in which the amount of deformation is especially large in the end plate 36. However, the first ribs 20a to 20d and the second ribs 22a to 22d may also be provided in a region that does not overlap the single cells 12 or the power generation region 28 as seen from the stacking direction.

The heights of the first ribs 20a to 20d and the heights of the second ribs 22a to 22d need not be uniform throughout the entire end plate 36. For example, each of the first ribs 20a to 20d and the second ribs 22a to 22d may be found so as to become gradually taller toward the center of the end plate 36. Also in this case, reducing the height of one type of ribs (the second ribs 22a to 22d) than the other type of ribs (the first ribs 20a to 20d) in regions including the intersections can achieve the above-described effects.

C. Other Embodiments (C1) In the above-described embodiment, the end plate 36 is formed as a plate-shaped member having a quadrangular shape as seen from the stacking direction, and the first ribs 20a to 20d are parallel to the short sides (parallel to the Y-direction) and the second ribs 22a to 22d are parallel to the long sides (parallel to the X-direction), but a different configuration may be adopted. For example, the end plate 36 may have a shape different from a quadrangular shape as seen from the stacking direction. The extension direction of the first ribs 20a to 20d and the extension direction of the second ribs 22a to 22d can be set to arbitrary directions that are different from each other. The first ribs 20a to 20d need not be parallel to one another, and the second ribs 22a to 22d need not be parallel to one another. In this case, at least the angle formed by the first ribs and the angle formed by the second ribs should be within predetermined ranges. The first ribs 20a to 20d and the second ribs 22a to 22d may extend in a curved line, instead of a straight line, as seen from the stacking direction. In this case, at least intersections at which the first ribs 20a to 20d and the second ribs 22a to 22d intersect each other should be formed, and the second ribs 22a to 22d should be formed so as to be shorter in height than the first ribs 20a to 20d.

In the above-described embodiment, four first ribs 20a to 20d and four second ribs 22a to 22d are provided, but the numbers of the first ribs and the second ribs may be other than four. The number of the first ribs and the number of the second ribs may be both one, or a number other than four that is larger than one.

Also when the shape of the end plate 36 or the arrangement or number of the first ribs and the second ribs is thus changed, it is preferable that the first ribs that are taller than the second ribs be ribs in which a maximum value of a stress generated is larger than a maximum value of a stress generated in the second ribs when it is assumed that the second ribs are formed so as to be equal in height to the first ribs and that the resulting fuel-cell end plate is incorporated into the fuel cell stack 10. The stresses based on this assumption can be calculated by the CAE analysis already described. In this configuration, it is possible to enhance the mitigating effect on the local increase in stress in the end plate 36 as a whole by reducing the stress generated in the first ribs in which a larger stress is generated if the first ribs and the second ribs are equal in height to each other. However, the relationship between the ribs in terms of the height can be reversed from the above-described one.

(C2) The back surface of the end plate 36 that is on the opposite side of the surface where the first ribs and the second ribs are formed is a flat surface in the above-described embodiment, but this back surface may instead have recesses and protrusions. Also in this case, at least the height of the second ribs from the contact surface of the end plate 36 (the surface of the end plate 36 that is parallel to the XY-plane and comes into contact with the insulating plate 35) should be smaller than that of the first ribs.

(C3) In the above-described embodiment, the first ribs and the second ribs are provided on the end plate 36. Instead of or in addition to the end plate 36, the end plate 37 may be provided with similar ribs.

(C4) The end plate provided with the first ribs and the second ribs is made of metal in the above-described embodiment, but the end plate may be made of a different material, such as resin. The material composing the end plate can be selected as appropriate according to the operating temperature, the required strength, or the weight of the fuel cell.

This disclosure is not limited to the above-described embodiment but can be implemented in various configurations within the scope of the gist of the disclosure. For example, to solve part or the whole of the above-described problem or achieve some or all of the above-described effects, the technical characteristics of the embodiment corresponding to those of the forms described in the section SUMMARY can be substituted or combined as appropriate. Unless described as essential in this specification, technical characteristics can be omitted as appropriate.

What is claimed is:

1. A fuel-cell end plate that is disposed at an end, in a stacking direction, of a fuel cell stack formed by stacking a plurality of members including a single cell, the fuel-cell end plate comprising, on a surface that is disposed so as to face an outside of the fuel cell stack:
   first ribs that extend in a first direction; and
   second ribs that extend in a second direction different from the first direction, intersect the first ribs, and are formed so as to be shorter in height than the first ribs at the intersections of the first ribs and the second ribs such that a step is formed at each of the intersections, wherein the height of each of the first ribs and the second ribs extends in a third direction perpendicular to the first and second directions.

2. The fuel-cell end plate according to claim 1, wherein a difference in height between the first ribs and the second ribs is not smaller than 4 mm.

3. The fuel-cell end plate according to claim 1, wherein the first ribs are ribs in which a maximum value of a stress generated is larger than a maximum value of a stress generated in the second ribs when it is assumed that the second ribs are formed so as to be equal in height to the first ribs and that the fuel-cell end plate having these ribs is incorporated into the fuel cell stack.

4. The fuel-cell end plate according to claim 1, wherein:
the fuel-cell end plate is a plate-shaped member having, as seen from the stacking direction, a quadrangular shape bounded by a pair of short sides that are disposed opposite each other and a pair of long sides that are disposed opposite each other and formed so as to be longer than the pair of short sides; and
the first ribs are formed so as to connect the pair of long sides to each other, and the second ribs are formed so as to connect the pair of short sides to each other.

5. The fuel-cell end plate according to claim 1, wherein the first ribs and the second ribs are provided in a region that overlaps the single cell when the fuel cell stack is seen from the stacking direction.

6. The fuel-cell end plate according to claim 1, wherein:
a plurality of fastening points for fastening the fuel cell stack is provided; and
at least any of the first ribs and the second ribs includes a rib provided at such a position as to connect two of the fastening points to each other.

* * * * *